US011873990B2

(12) United States Patent
Chartier et al.

(10) Patent No.: US 11,873,990 B2
(45) Date of Patent: Jan. 16, 2024

(54) BACKPACKING STOVE HAVING TIP VALVE (71) Applicants: Ryan Paul Chartier, Manchester, NH (US); Michael Edward Hebert, Jr., Milford, NH (US); Adam Emery Wilcox, Candia, NH (US); Michael Steven Siopis, Hooksett, NH (US)

(72) Inventors: Ryan Paul Chartier, Manchester, NH (US); Michael Edward Hebert, Jr., Milford, NH (US); Adam Emery Wilcox, Candia, NH (US); Michael Steven Siopis, Hooksett, NH (US)

(73) Assignee: Johnson Outdoors Inc., Racine, WI (US)

( * ) Notice: Subject to any disclaimer, the term of this patent is extended or adjusted under 35 U.S.C. 154(b) by 156 days.

(21) Appl. No.: 17/529,537

(22) Filed: Nov. 18, 2021

(65) Prior Publication Data

US 2022/0154928 A1 May 19, 2022

Related U.S. Application Data

(60) Provisional application No. 63/115,292, filed on Nov. 18, 2020.

(51) Int. Cl.
*F23D 14/46* (2006.01)
*F24C 3/14* (2021.01)

(52) U.S. Cl.
CPC ............... *F23D 14/46* (2013.01); *F24C 3/14* (2013.01); *F23D 2208/00* (2013.01); *F23D 2900/21* (2013.01)

(58) Field of Classification Search
CPC ..................... F23K 2900/05001; F23N 5/247
(Continued)

(56) References Cited

U.S. PATENT DOCUMENTS 4,082,993 A 4/1978 Oakes
4,380,428 A 4/1983 Rozzi
(Continued)

FOREIGN PATENT DOCUMENTS

EP 1348910 A1 10/2003
EP 2142856 B1 5/2018
(Continued)

OTHER PUBLICATIONS

"EcoBurner—The Safe & Sustainable Buffet System", *EcoBurner Ltd.*, 2021, 11 pages. https://ecoburner.com/ecoburner/.

*Primary Examiner* — Vivek K Shirsat
(74) *Attorney, Agent, or Firm* — Reinhart Boerner Van Deuren P.C.

(57) ABSTRACT

A tip valve and a cook system incorporating same that automatically stops the flow of gas to a burner when tipped over and that automatically resets when disconnected from the fuel canister to allow the flow of gas to resume when righted and reconnected are provided. The tip valve includes a ball bearing freely moveable between a fuel canister actuator pin and a tip seal within a bore having two different diameters at each end thereof. The transition between the two diameters forms a taper that may be continuous forming a smooth tapered bore, or discontinuous formed by at least one counter bore. The automatic resetting is provided without the use of a mechanical pin or member.

20 Claims, 6 Drawing Sheets

(58) Field of Classification Search
USPC .................. 431/88, 89; 137/43, 38; 429/85
See application file for complete search history.

(56) References Cited

U.S. PATENT DOCUMENTS

| | | | |
|---|---|---|---|
| 5,549,130 A * | 8/1996 | Schuster | F16K 17/366 137/39 |
| 8,539,942 B2 | 9/2013 | Walsh et al. | |
| 2004/0011350 A1* | 1/2004 | Dowst | A47J 27/022 126/344 |

FOREIGN PATENT DOCUMENTS

| KR | 10-1609632 B2 | 4/2016 |
|---|---|---|
| WO | WO 2003083368 A2 | 10/2003 |
| WO | WO 2012/076845 A2 | 6/2012 |

* cited by examiner

BACKPACKING STOVE HAVING TIP VALVE

CROSS-REFERENCE TO RELATED PATENT APPLICATIONS

This patent application claims the benefit of U.S. Provisional Patent Application No. 63/115,292, filed Nov. 18, 2020, the entire teachings and disclosure of which are incorporated herein by reference thereto.

FIELD OF THE INVENTION

This invention generally relates to backpacking stoves, and more particularly to fuel control valves for use therewith.

BACKGROUND OF THE INVENTION

As more people discover the joys of hiking and camping, the greater the demand for gear that makes such activities even more enjoyable and comfortable. While car and RV campers and overlanders can bring along as much gear as they choose to ensure their comfort, make their coffee or tea, and cook their meals, those who hike and tent or hammock camp are much more limited both in volume and weight of the gear they can bring along. While the traditional camp stove is well suited for outdoor cooking at the campsite, its size and weight make it nearly impossible to bring along if one is hiking in and out any distance. Indeed, the use of such stoves also requires one to bring fuel, pots, and pans, which further increases the weight and volume of the gear required.

Recognizing that hikers and campers needed a solution to the volume and weight issue presented by traditional camping stoves and cookware, in 2001 Dwight Aspinwall and Perry Dowst revolutionized backcountry cooking by creating a fast, compact and efficient stove unlike anything the world had ever seen. This breakthrough cook system is described in the original published US Patent Application Publication 2004/0011350 A1, entitled Heating Vessel, the teachings and disclosure of which are hereby incorporated in their entireties by reference thereto. Unlike prior stoves, this new cook system enabled hikers and campers to contain, within the heating vessel itself, all of the elements needed to rapidly and efficiently cook their food and make their coffee or tea. Once the campsite is reached, or even along or off the trail, the cooking system can be unpacked, assembled, and the user can begin cooking in less than a minute. Such cooking systems are now sold in various models under the Jetboil® brand by the assignee of the instant application.

While such a cooking system should be used on a stable, level surface to decrease the risk of the cooking system tipping over, it is recognized that level ground at the campsite or on the trail may not be available. Indeed, even when such exists, it may still be possible for a user to accidently knock over the cooking system. Because such cooking systems are designed to cook in a vertical orientation, when tipped over on its side, the flame from the burner no longer correctly heats the bottom of the heating vessel. Furthermore, in a generally horizontal orientation when knocked over such stoves may begin to consume liquid fuel instead of the intended vapor fuel. The burning of the liquid fuel can result in flaring, which can result in damage to the product, e.g. the shroud that typically surrounds the burner.

To prevent the continued flow of gas to a burner when a heating appliance is tipped over, it is known to use a tip valve. Such tip valves allow the flow of gas when in the normal, vertical position, but operate to shut off gas flow when tipped over to a generally horizontal position. Typically, these valves use a ball bearing within a constant diameter bore. When in a vertical orientation, the ball bearing is held at the bottom of the bore by gravity. Gas flows through the bore, either around the ball bearing or from the side, past a seal, and to the burner. A flow control valve may also be used in the gas path to control the intensity of the flame and to turn the appliance off when not in use.

When the appliance is tipped over, the ball bearing of the tip valve is allowed to roll within the length of the bore, aided by the flow of gas though the bore and unimpeded by gravity in this generally horizontal orientation. The ball bearing is then intended to seat against an o-ring seal and be held in place by the gas pressure in the bore upstream of the ball bearing. The seating of the ball bearing against the o-ring is intended to cut off the further supply of gas to burner, which extinguishes the flame.

Unfortunately, the constant diameter of the bore can result in two competing issues. First, if the bore diameter is close to the diameter of the ball bearing, the flow of fuel around the ball bearing is impeded and may affect the normal flame control by the flow control valve. Second, if the bore diameter is significantly greater than the diameter of the ball bearing so as not to impede fuel flow therearound, then correct seating of the ball bearing against the o-ring when tipped over cannot be reliably ensured. This is because the ball bearing may contact only a point on or portion of the o-ring with its outer surface when rolling along the bore due to the larger diameter thereof. The gas pressure aiding the rolling of the ball bearing or kinetic energy of the ball bearing itself may not always be enough to ensure that the ball bearing continues to advance beyond this initial contact with the o-ring to then completely seat therein.

When the ball bearing does seat correctly, because of the pressure of the gas within the bore, the ball bearing is held in its actuated position against the o-ring even when the appliance is returned to its normal vertical position. In order to reset the tip valve, a pin or other member is pushed against the ball bearing from the downstream (burner) side to dislodge it and allow gravity to return it to the bottom of the bore. In one such system described in U.S. Pat. No. 8,539,942, the pin is designed to be part of the flow control valve such that when the flow control valve is fully turned off, the pin traverses the seal and presses against the ball bearing to dislodge it from the seal.

Unfortunately, once the stove tips over and the ball bearing of the tip valve seats against the seal to shut off the flow of gas, if even for the briefest moment, the user will have to manipulate the flow control valve to fully shut off the stove in order for the pin to unseat the ball bearing from the seal. The flow control valve will then have to be turned back on to enable operation of the stove. However, such required operation in order to reset the tip valve can lead to user dissatisfaction for several reasons.

First, once the stove has been righted, the user may try to relight the burner. However, because the gas pressure is holding the ball bearing against the seal, the burner will not relight. This is frustrating for the user because the flow control valve is likely already set where the user wants it to be for the cooking operation to resume. The user must then close the flow control valve, reopen the flow control valve, light the burner, then readjust the flow control valve to the desired position that had been previously set.

Second, because the flame is extinguished and there is no gas flow from the burner, the user may believe that the flow control valve is already turned off. As such, the user may believe that there is no logical reason to turn off a valve that is already off. The user may then try to open the flow control valve in order to get the burner to relight, as is typically done during normal ignition of the burner. The failure of such familiar operation of the flow control valve to allow the burner to be lit causes confusion and frustration on the part of the user. This is because the user may not realize that they must first turn the flow control valve completely off and then back on in order to light the burner. Instead, when the flow control valve is manipulated to turn it on to allow gas flow and ignition, and gas does not flow, the user may well believe that the stove is broken and may seek warrantee service, post bad online reviews, etc.

Third, the tip valve may be actuated when the stove is held by the user in a generally horizontal position either during assembly or when the burner is attempted to be lit. Since the tip valve is actuated, despite it being purposely held in such generally horizontal position and not as a result of an accident, even setting the stove in the vertical position will not allow ignition. Once again, the user will then have to know to shut off the flow control valve in order to have the pin dislodge the ball bearing from the seal, or the stove cannot be lit.

Fourth, systems requiring a pin to dislodge the ball bearing can cause the stove to be completely disabled if the pin breaks, is lost, or is worn to the point where it can no longer dislodge the ball bearing from the seal. In such circumstances, the stove may be rendered useless to the hiker or camper.

Because many more people are now trying hiking and camping who heretofore have not, expecting them to know the nuances of operating such equipment with which they may have little familiarity, simply discourages these people from trying hiking and camping again or growing into the activity. Indeed, besides the frustration that results, these new hikers and campers may well be prevented from cooking a meal or heating water.

In view of the above, there is a need in the art for a tip valve that does not affect the normal gas flow control, that automatically and reliably actuates upon tipping of the cooking system, and that does not require that a pin be used to reset the tip valve. Embodiments of the present invention provide such a tip valve. These and other advantages of the invention, as well as additional inventive features, will be apparent from the description of the invention provided herein.

BRIEF SUMMARY OF THE INVENTION

In view of the above, embodiments of the present invention provide a new and improved cooking system that overcomes one or more of the above described problems existing in the art. More particularly, embodiments of the present invention provide a new and improved cooking system having a tip valve that overcomes one or more of the above described problems existing in the art. Even more particularly, embodiments of the present invention provide a tip valve for use with gas burning appliances that overcomes one or more of the above described problems existing in the art.

In one embodiment, the tip valve is formed as a component of the threaded fuel canister connector of the cook system of the present application. The tip valve includes a tip seal and a ball bearing housed within a tapered bore between an actuator pin for the fuel canister and a flow path to the burner. The tip seal may be an O-ring, a faced or contoured seal. The fuel canister connector formed by the tip valve may be configured as an adapter for an existing cook system, in which case it also includes a fuel canister seal, typically an O-ring, that seals against the fuel canister connector. In such an embodiment, the tip valve includes an external threaded connector portion that mates with the burner base as if it were the fuel canister connector, and includes an internal treaded connector portion that mates with the fuel canister connector.

In another embodiment, the fuel canister connector formed by the tip valve may be configured as an insert to the burner base of the cook system, in which case it positions the tip seal such that it seals against the burner base. In such an embodiment, the tip valve includes an external threaded connector portion that mates with the burner base, and includes an internal treaded connector portion that mates with the fuel canister connector.

In one embodiment, the tip valve utilizes an actuator pin assembly that includes a threaded connector portion that allows removable fixation within the fuel canister connector formed by the tip valve. In this embodiment the threaded connector portion of the actuator pin assembly includes a shoulder to limit the insertion of the actuator pin assembly within the fuel canister connector formed by the tip valve. The actuator pin assembly also includes in the present embodiment an actuator pin that is held within the threaded connector portion. This actuator pin includes a fuel passage as is known in the art and is configured to actuate against the standard connector of the fuel canister to allow the admission of gaseous fuel therethrough. In one embodiment, the actuator pin is interference fit within the threaded connection portion of the actuator pin assembly, although in alternative embodiments the securement of the actuator pin within the threaded connector portion of the actuator pin assembly may be via spin weld, spot weld, adhesive, etc.

In an alternative embodiment, the actuator pin includes a flange that may be directly interference fit, threaded, spot welded, spin welded, adhesively connected, etc. directly to the fuel canister connector formed by the tip valve. Such alternative embodiment does not require the utilization of a threaded connector portion.

In preferred embodiments of the tip valve of the present invention, the bore in which the ball bearing resides is tapered in a manner such that it is wider at the end closest the actuator pin and narrower near the end that includes the tip seal. Such a tapered bore configuration allows fuel flow around the ball bearing, through the tapered bore, and to the burner during normal vertical orientation. Such tapered bore also allows movement of the ball bearing through the tapered bore and facilitates proper, reliable seating against the tip seal to stop the flow of gaseous fuel when tipped over or oriented generally horizontally. Automatic reset, i.e. by movement of the ball bearing off of the tip seal, is accomplished when the burner assembly is removed from the fuel canister and reoriented to a vertical position with the tip seal above the fuel canister by operation of gravity alone. This allows reset of the tip valve without the need mechanically to dislodge the ball bearing from the tip seal via a pin or other member. Indeed, such removal of the fuel canister from the burner assembly when the burner flame goes out unexpectedly is a familiar procedure, e.g. so that the canister fuel level can be checked.

In alternative preferred embodiments of the tip valve of the present invention, the bore in which the ball bearing resides includes a counter bore positioned such that the diameter is wider at the end nearest the actuator pin and narrower near the end that includes the tip seal. Such a counter bore configuration allows fuel flow around the ball bearing, through the bore and counter bore, and to the burner during normal vertical orientation. Such counter bore also allows movement of the ball bearing through the counter bore and facilitates proper, reliable seating against the tip seal to stop the flow of gaseous fuel when the stove is tipped over or oriented generally horizontally. Automatic reset, i.e. by movement of the ball bearing off of the tip seal, is accomplished when the burner assembly is removed from the fuel canister and reoriented to a vertical position with the tip seal above the fuel canister by operation of gravity alone. This allows reset of the tip valve without the need mechanically to dislodge the ball bearing from the tip seal via a pin or other member. Indeed, such removal of the fuel canister from the burner assembly when the burner flame goes out unexpectedly is a familiar procedure, e.g. so that the canister fuel level can be checked.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
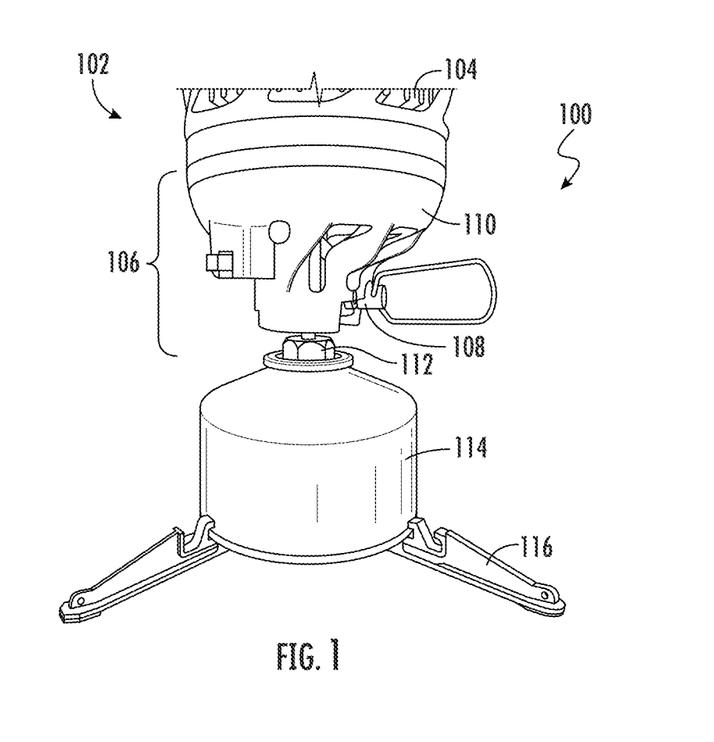
FIG. 1 is a photograph of an embodiment of a portable backpacking stove constructed in accordance with the teachings of the present invention mounted to a fuel tank having a fuel can stabilizer affixed to the bottom thereof.

Turning now to the drawings, there is illustrated in FIG. 1 a photograph of a partial cook system to which the tip valve is particularly well-suited and for which the following description will describe. However, the following description of the various embodiments of the present invention may also find applicability in other gas burning appliances, and therefore the following description should be taken by way of example and not by way of limitation.

In view of the incorporation of the description of the original cook system discussed above, a detailed description will not be provided herein in the interest of brevity. However, FIG. 1 does illustrate a portion of such cook system 100 and includes the bottom portion of heating vessel 102 including the Fluxring® heating coils 104 that provide significant advantages in efficient and rapid heat transfer to cook the contents of the heating vessel 102. As will be recognized by those skilled in the art, the heating vessel 102 is positioned on top of the burner base 106 in the embodiment illustrated. This burner base 106 includes the flow control valve 108 and the burner base shroud 110. In the embodiment illustrated in FIG. 1, the fuel canister stabilizer 116 is utilized to enhance stability of the cook system 100, although the use thereof is optional.

The burner base 106 is connected to the fuel canister 114 via an adapter-type tip valve in the form of a fuel canister connector 112. Such an embodiment allows the tip valve to be added as an adapter for an existing cook system. In such an embodiment, a fuel canister seal O-ring that seals against the fuel canister connector is also included. In such an embodiment, the tip valve includes an external threaded connector portion that mates with the burner base as if it were the fuel canister connector, and includes an internal threaded connector portion that mates with the fuel canister connector.

Figure 2:
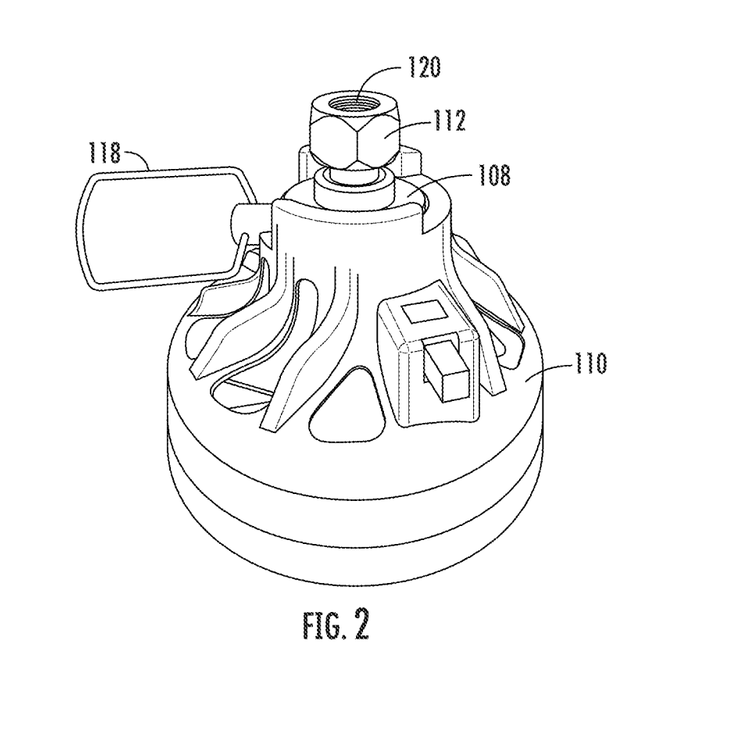
FIG. 2 is a photograph of the bottom portion of the burner assembly of the embodiment shown in FIG. 1 shown inverted to expose the fuel tank fitting.

Turning to FIG. 2, details of the tip valve forming an adapter-type fuel canister connector 112 may be seen in detail. Indeed, while a fuel canister connector is typically included in the burner base of the cook system described above, in the illustrated embodiment the tip valve forms the adapter-type fuel canister connector 112 that functions to connect to the fuel canister via the standard threaded connection 120 visible in FIG. 2. This FIG. 2 also illustrates the external threaded connection of the adapter-type fuel canister connector 112 that allows securement to the fuel control valve 108, the adjustment of which it is accomplished via bail 118.

Figure 3:
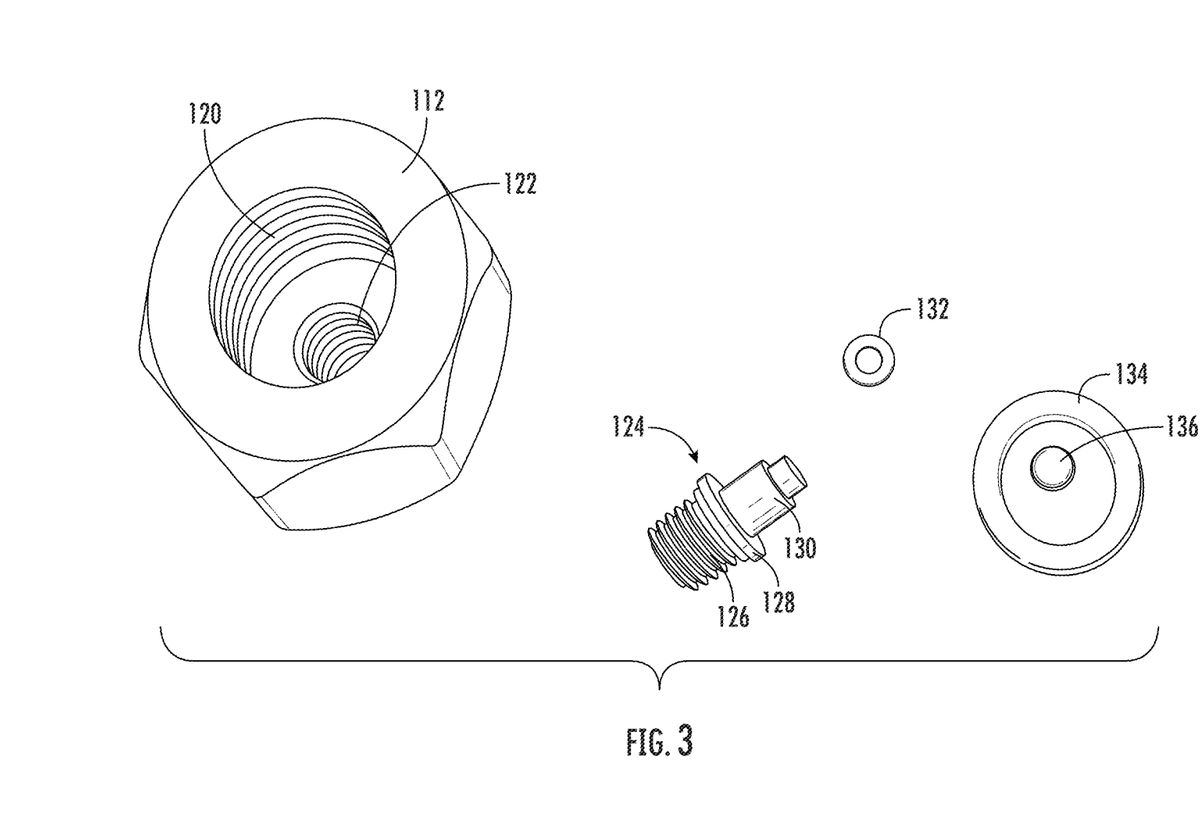
FIG. 3 is a photograph of an embodiment of a disassembled fuel tank fitting illustrating components of an embodiment of the tip valve of the present invention.

FIG. 3 illustrates an embodiment of the tip valve formed as the adapter-type fuel canister connector 112 and the disassembled components thereof. This FIG. 3 once again illustrates the threaded connector 120 that provides the standard screw connection to the fuel canister, and also illustrates the internal threaded connection 122 into which the actuator pin assembly 124 is screwed via the threaded connection 126 of the actuator pin assembly 124. In the illustrated embodiment, the actuator pin assembly 124 also includes a shoulder 128 that limits the depth to which the actuator pin assembly 124 may be threaded into the body of the fuel canister connector 112. This actuator pin assembly 124 also includes the actual actuator pin 130 that provides the standard actuation in coordination with the fuel canister to allow the flow of fuel to the burner of the cook system as discussed above.

FIG. 3 also illustrates the tip seal, e.g. an O-ring 132, against which the ball bearing 136 seats when in an actuated position as will be discussed more fully below. Also illustrated is the fuel canister seal O-ring 134 that provides the sealing interface between the fuel canister connector 112 and the connector on the fuel canister itself.

Figure 4:
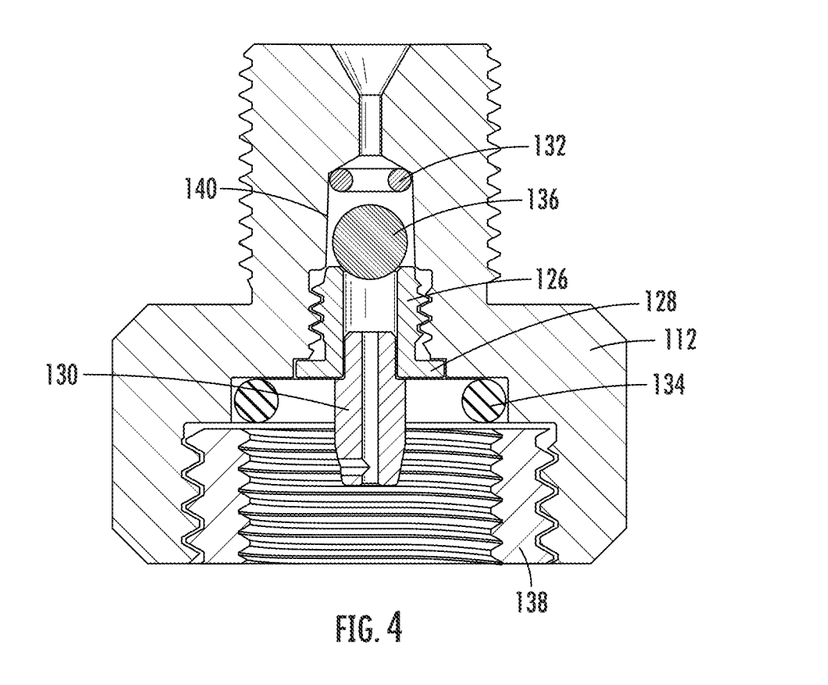
FIG. 4 is a cross-sectional illustration of an embodiment of a fuel tank fitting incorporating an embodiment of the tip valve of the present invention in the normal operating position.

Turning now to FIG. 4, there is illustrated a cross-section of the assembled tip valve forming the adapter-type fuel canister connector 112 incorporating the components as discussed with regard to FIG. 3. This FIG. 4 also illustrates the fuel canister connection in simplified partial cross-section.

As may be seen from this FIG. 4, the fuel canister seal 134 provides a sealing interface between the fuel canister connector 138 and the fuel canister connector 112. The actuator pin 130 extends downwardly in this FIG. 4 and would typically contact the fuel canister interface to allow the flow of fuel therethrough. In the illustrated embodiment, this actuator pin 130 is interference fit into the threaded connector portion 126, until it contacts shoulder 128. This shoulder 128 also limits the insertion of the overall actuator pin assembly into the fuel canister connector 112 as discussed above. While the embodiment illustrated in FIG. 4 utilizes an interference fit of the actuator pin 130 to complete the actuator pin assembly, it may also be held in place via a friction weld, spot weld, adhesive, or other known techniques in other embodiments.

The ball bearing 136 of the tip valve is positioned within a tapered bore 140 of the fuel canister connector 112. At the uppermost end of this tapered bore 140, the tip seal, e.g. an O-ring 132, is positioned. Thereabove, a fuel passage is provided that connects through the burner base discussed above to the actual burner for operation of the cook system. Once assembled and in its correct orientation as shown in this FIG. 4, gaseous fuel flows from the fuel canister through the actuator pin 130 around the ball bearing 136 through the tapered bore 140 and continuing to the burner for ignition. As will be evident to those skilled in the art, the flow of gaseous fuel around ball bearing 136 may be enabled via the gas pressure itself, or in other embodiments through openings or the configuration of the opening of the threaded portion 126 between the ball bearing 136 and the end of the threaded connection portion 126 of the actuator pin assembly 124. Advantageously, the larger diameter of the tapered bore 140 at this end enables gaseous fuel flow with being impeded by a narrower diameter as discussed above.

Figure 5:
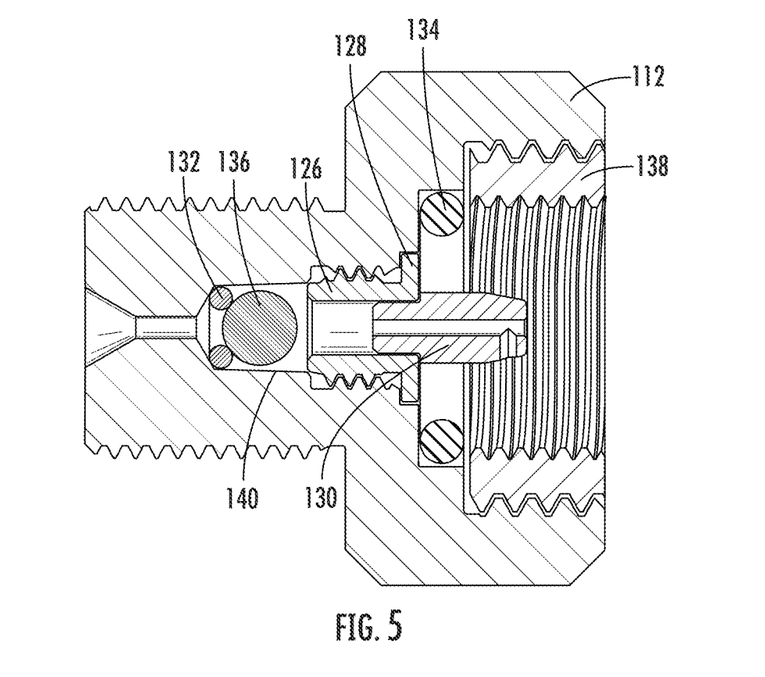
FIG. 5 is a cross-sectional illustration of the embodiment of the fuel tank fitting incorporating the embodiment of the tip valve of FIG. 4 in the tip position.

If the orientation of the fuel canister connector 112 is rotated as shown in FIG. 5, as may occur if the cook system is tipped over onto its side, the tip valve will operate as the ball bearing 136 sealingly engages the tip seal, e.g. O-ring 132. In other words, once tipped to the side the ball bearing is allowed to travel the length of the tapered bore 140 aided by the flow of gaseous fuel therethrough until it engages the tip seal, e.g. O-ring 132. Advantageously, and unlike the prior tip valves discussed above, the taper of the bore 140 aids in positioning of the ball bearing 136 to ensure this proper, reliable seating on the tip seal, e.g. O-ring 132. Once in this position, the flow of fuel to the burner is cut off, which will extinguish the flame and prevent any damage that may otherwise occur if the flame is allowed to continue in such orientation.

Also advantageously, and also unlike the prior tip valves discussed above, once the tip valve is righted, i.e. once the cook system is placed back in its normal vertical orientation and disconnected from the fuel canister, the ball bearing 136 automatically returns to the position shown in FIG. 4. No pin or other mechanism is required to push the ball bearing 136 off of the tip seal 132 in order to re-enable normal operation.

The taper of the tapered bore 140 is provided such that the end of the tapered bore 140 closest to the actuator pin assembly has a greater diameter than the end of the tapered bore 140 where the tip seal, e.g. O-ring 132, is positioned. This tapering, or widening if traversing the opposite direction, allows for the generally unimpeded flow of fuel around the ball bearing 136 during normal operation and the guiding of the ball bearing 136 to the tip seal to ensure a proper and reliable seal against the tip valve unlike the constant diameter bore of the previous tip valves discussed above. The angle of the taper of the walls of the tapered bore 140 may vary depending on application, fuel pressure, size and weight of the ball bearing, length of the bore, etc. In certain embodiments the angle of taper is between 1° and 45°, preferably between 5° and 20°, and most preferably between 7° and 12°.

Figure 6:
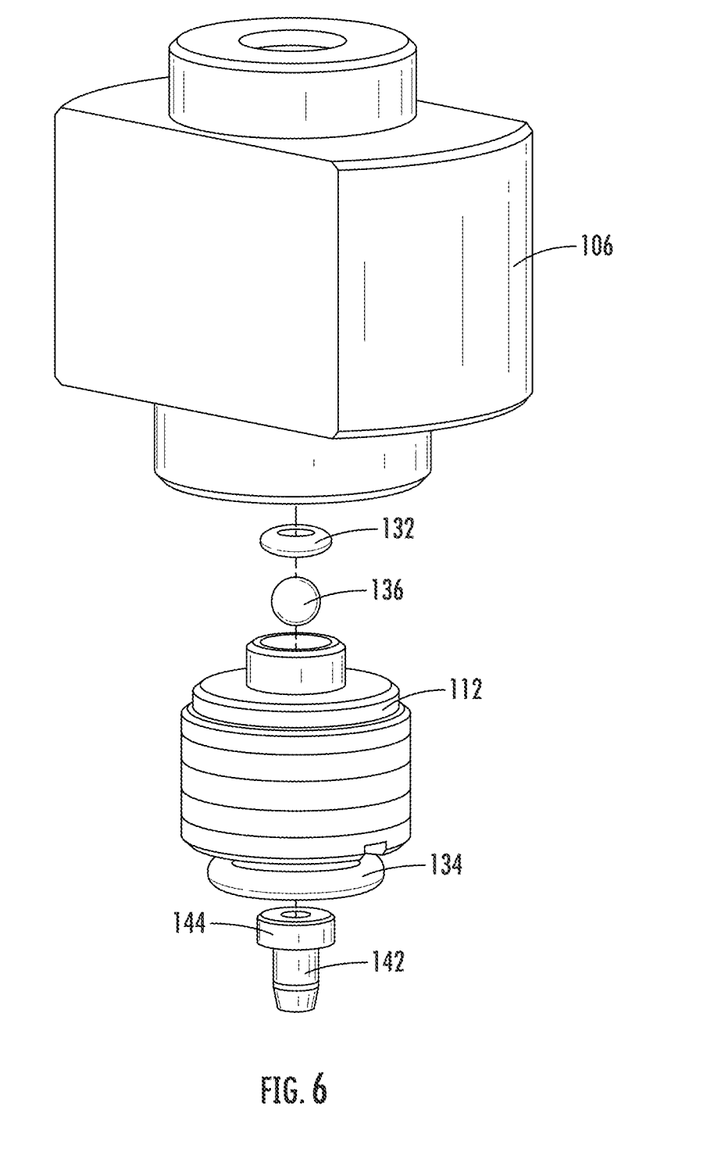
FIG. 6 is an exploded isometric illustration of an alternate embodiment of a fuel tank fitting incorporating an alternative embodiment of the tip valve of the present invention.
Figure 7:
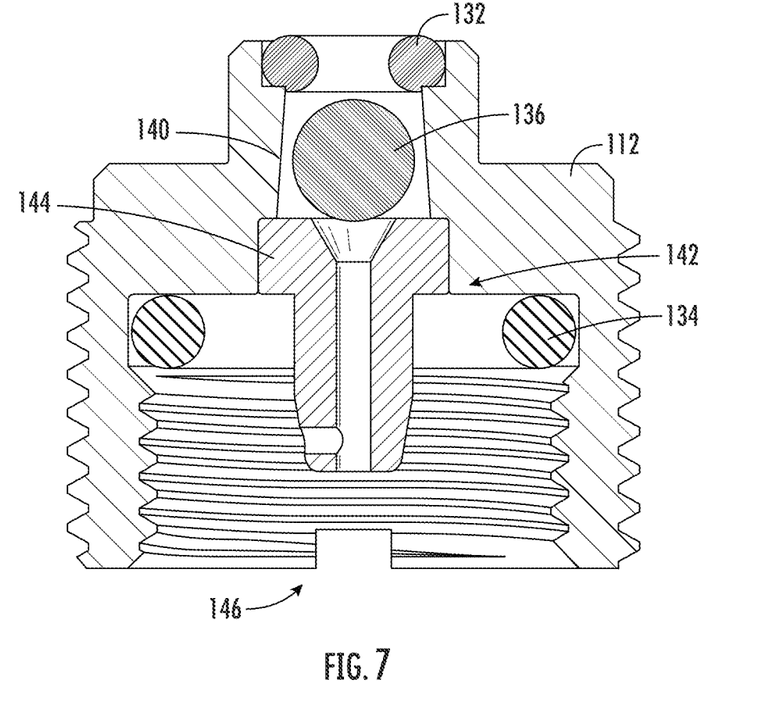
FIG. 7 is a cross-sectional illustration of the alternate embodiment of a fuel tank fitting incorporating an alternative embodiment of the tip valve of FIG. 6 shown in the normal operating position.
Figure 8:
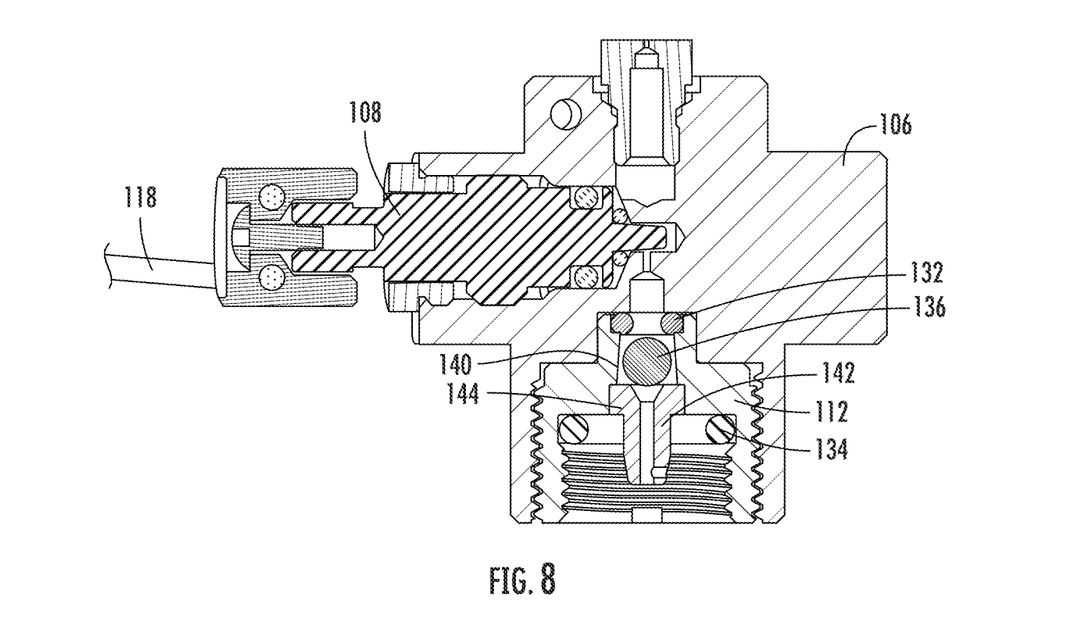
FIG. 8 is a cross-sectional partial illustration of an embodiment of a burner control assembly having a fuel tank fitting incorporating the embodiment of the tip valve of FIG. 6 shown in the normal operating position.

FIG. 6 provides an exploded view of an alternative embodiment of a tip valve forming an insert-type fuel canister connector 112, while FIG. 7 illustrates this embodiment assembled. This embodiment is also shown in FIG. 8 installed in a burner base 106 of an exemplary backpacking stove. As illustrated, the tip seal, e.g. O-ring 132, is provided from an outside position of the fuel canister connector 112 into an seal retention groove. While this embodiment still utilizes the ball bearing 136 and the tapered bore 140, the actuator pin 142 seats directly into the fuel canister connector 112 body via the flange 144. This connection into the body may be via an interference fit, a spin weld, a spot weld, adhesive, etc. Because this embodiment may be threaded into the burner base to provide a flush fit therewith as will be discussed more fully below, locator slots 146 are provided to allow the fuel canister connector 112 to be inserted in the burner base via the illustrated external threads. Once inserted in the burner base 106 as shown in FIG. 8, operation of the tip valve and the automatic reset thereof upon removal from the fuel canister will proceed as discussed above and as enabled by the tapered bore 140.

Figure 9:
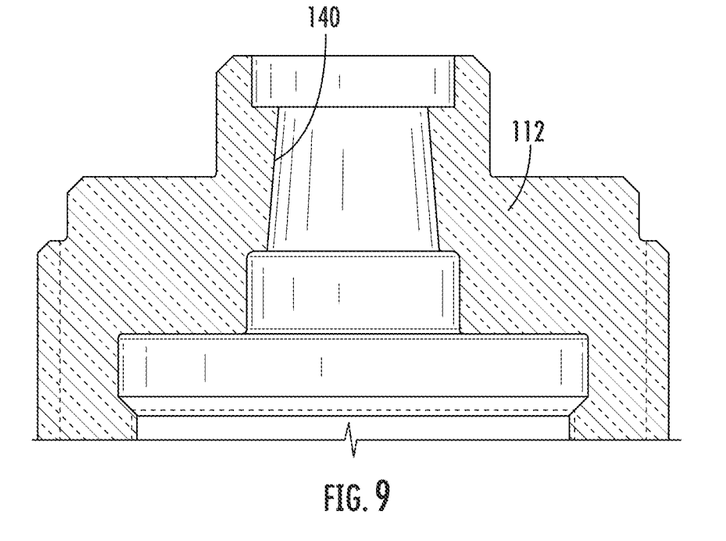
FIG. 9 is a cross-sectional partial illustration of an embodiment of a fuel canister connector in accordance with an embodiment of the present invention with the other components of the tip valve removed so as to illustrate a continuously taper of the bore.
Figure 10:
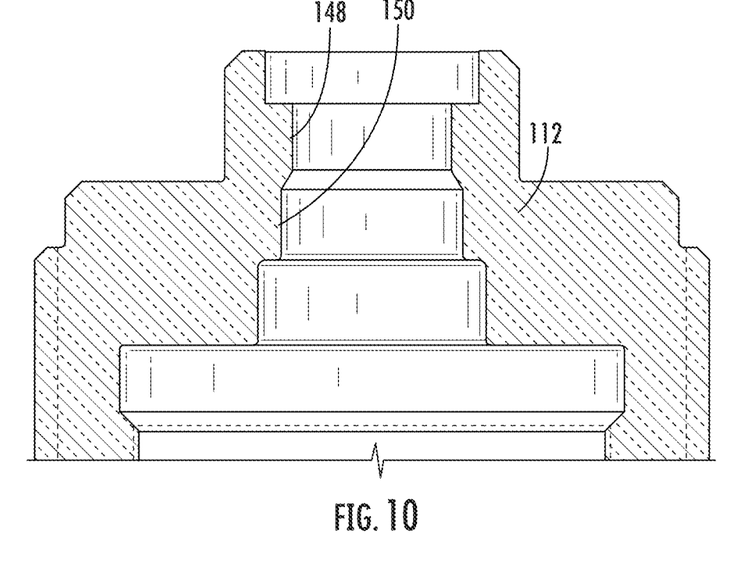
FIG. 10 is a cross-sectional partial illustration of an embodiment of a fuel canister connector in accordance with an alternate embodiment of the present invention with the other components of the tip valve removed to illustrate a discontinuous taper of the bore formed by a counter bore.

FIG. 9 and FIG. 10 illustrate two embodiments of the fuel canister connector 112 with the other components of the tip valve removed. In FIG. 9 the fuel canister connector 112 utilizes a continuous, smooth taper for the tapered bore 140 as discussed above. However, in FIG. 10, the tapered bore utilizes a discontinuous taper of the bore formed by a bore 148 and counter bore 150. Such counter bore 150 may be an enlarged diameter area at the end of the bore 148, or may be a taper that traverses only a portion of the length of the bore 148. As may be seen, such counter bore 150 is positioned at the end of the bore 148 farthest from the tip seal to provide a larger diameter area to provide the generally unimpeded fuel flow discussed above. In certain embodiments, the bore 148 may be tapered in similar manner to tapered bore 140 discussed above to guide and properly seat the ball bearing on the tip seal. In other embodiments, the tapered bore may be formed by multiple steps or counter bores or by a combination of continuous and discontinuous tapered portions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tip valve for a cook system having a burner base housing a burner within a shroud configured to combust fuel from an external fuel canister, comprising:
    a fuel canister connector body having a threaded connector configured to threadably connect to the external fuel canister, the fuel canister connector body defining a bore therethrough, the bore having a portion configured to house a ball bearing therein, the portion of the bore having a first diameter at a first end of the portion of the bore nearest the threaded connector and a second diameter smaller than the first diameter at a second end of the portion of the bore opposite the first end;
    an actuator pin fixably positioned proximate the first end of the portion of the bore;
    a tip seal positioned proximate the second end of the portion of the bore; and
    the ball bearing movably positioned in the portion of the bore between the actuator pin and the tip seal.

2. The tip valve of claim 1, wherein the portion of the bore defined by the fuel canister connector body is tapered between the first end and the second end.

3. The tip valve of claim 2, wherein an angle of taper is between 1° and 45°.

4. The tip valve of claim 3, wherein the angle of taper is between 5° and 20°.

5. The tip valve of claim 4, wherein the angle of taper is between 7° and 12°.

6. The tip valve of claim 2, wherein the taper is a continuous smooth taper.

7. The tip valve of claim 2, wherein the taper is a discontinuous taper.

8. The tip valve of claim 1, wherein the portion of the bore defined by the fuel canister connector body includes a tapered portion and a counter bore between the first end and the second end.

9. The tip valve of claim 1, wherein the first end of the portion of the bore defined by the fuel canister connector body is formed by a counter bore having the first diameter that is larger than the second diameter of the portion of the bore at the second end.

10. The tip valve of claim 1, wherein the fuel canister connector body includes an external threaded connector configured to threadably connect to the burner base.

11. A tip valve for a cook system having a burner base housing a burner within a shroud configured to combust fuel from an external fuel canister, comprising:
    a fuel canister connector body having a threaded connector configured to threadably connect to the external fuel canister, the fuel canister connector body defining a bore therethrough having a first diameter at a first end of the bore nearest the threaded connector and a second diameter smaller than the first diameter at a second end of the bore opposite the first end;
    an actuator pin fixably positioned proximate the first end of the bore;
    a tip seal positioned proximate the second end of the bore;
    a ball bearing movably positioned between the actuator pin and the tip seal;
    wherein the fuel canister connector body includes an external threaded connector configured to threadably connect to the burner base; and
    wherein the fuel canister connector body includes locator slots at the first end.

12. The tip valve of claim 1, wherein the tip seal is one of an O-ring, a faced or a contoured seal.

13. A tip valve for a cook system having a burner base housing a burner within a shroud configured to combust fuel from an external fuel canister, comprising:
    a fuel canister connector body having a threaded connector configured to threadably connect to the external fuel canister, the fuel canister connector body defining a bore therethrough having a first diameter at a first end of the bore nearest the threaded connector and a second diameter smaller than the first diameter at a second end of the bore opposite the first end;
    an actuator pin fixably positioned proximate the first end of the bore;
    a tip seal positioned proximate the second end of the bore;
    a ball bearing movably positioned between the actuator pin and the tip seal; and
    wherein the tip seal is positioned to seal against the burner base.

14. The tip valve of claim 1, wherein the actuator pin includes a threaded connector portion that allows removable fixation within the fuel canister connector body.

15. The tip valve of claim 14, wherein the threaded connector portion of the actuator pin includes a shoulder to limit insertion of the actuator pin within the fuel canister connector body.

16. The tip valve of claim 14, wherein the actuator pin includes a fuel passage, the actuator pin being configured to actuate against a standard connector of the external fuel canister to allow admission of gaseous fuel therethrough.

17. The tip valve of claim 1, wherein the actuator pin includes a flange that is one of interference fit, threaded, spot welded, spin welded, or adhesively connected directly to the fuel canister connector body.

18. The tip valve of claim 1, further comprising a fuel canister seal positioned within the fuel canister connector body to seal against the external fuel canister.

19. A cook system, comprising:
- a fuel canister;
- a burner base housing a burner within a shroud configured to combust fuel from the fuel canister; and
- a tip valve having a fuel canister connector body having a threaded connector configured to threadably connect to the fuel canister, the fuel canister connector body defining a bore therethrough for allowing fuel to flow from the fuel canister to the burner, the bore having a portion configured to house a ball bearing therein, the portion of the bore having a first diameter at a first end of the portion of the bore nearest the threaded connector and a second diameter smaller than the first diameter at a second end of the portion of the bore opposite the first end, an actuator pin fixably positioned proximate the first end of the portion of the bore, a tip seal positioned proximate the second end of the portion of the bore, and a ball bearing movably positioned between the actuator pin and the tip seal.

20. A method of resetting a tip valve of the cook system of claim 19, comprising the steps of:
- positioning the cook system in an orientation such that the burner is vertically higher than the fuel canister; and
- disconnecting the fuel canister from the fuel canister connector body.

* * * * *